INVENTOR
JAMES F. JOHNSON.

BY Adams, Forward and McLean
ATTORNEY

United States Patent Office 2,894,245
Patented July 7, 1959

2,894,245
SEISMIC SURVEYING METHOD

James F. Johnson, Tulsa, Okla., assignor to Sinclair Oil & Gas Company, Tulsa, Okla., a corporation of Maine Application August 18, 1953, Serial No. 375,007

6 Claims. (Cl. 340—15)

This invention relates to a method for improving the quality of reflection and refraction seismic surveys of an elastic medium which may be utilized, for example, in petroleum prospecting procedures. In one aspect my invention provides a means whereby interfering surface vibrations in seismic surveys are reduced by utilization of frequency phase shift to control the output of a geophone. In another aspect this invention affords a method for direct detection of frequency phase shift of seismic waves of selected frequencies and for recordation of this shift as a means of correlation to complete a seismic survey.

Figure 1:
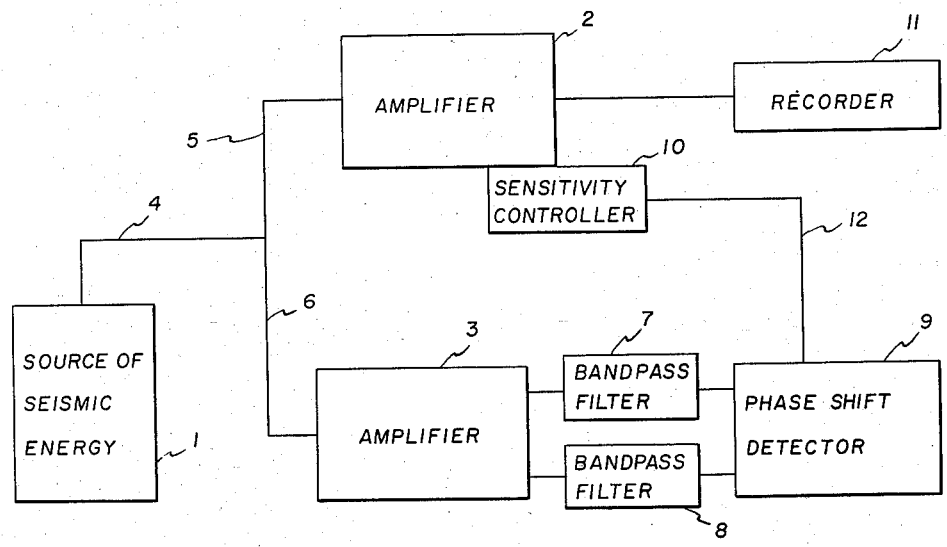
Figure 2:
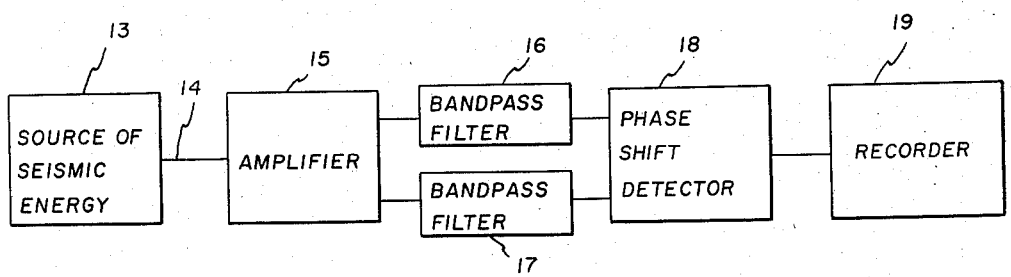

My invention will be described with reference to the accompanying drawings in which:

Figure 1 is a graphical representation of an arrangement of conventional apparatus which may be utilized to eliminate the effects of surface waves in conventional reflection and refraction seismic surveys; and Figure 2 is a graphical representation of an arrangement of conventional apparatus which may be utilized in making a phase shift recording or which may detect directly the desired frequency phase shifts and utilize this shift for driving seismic recorders.

In conventional petroleum seismic prospecting systems, an explosive charge is detonated at an induction or shot point located at or near the surface of the ground, thus initiating seismic waves which penetrate the subterranean strata. Portions of these waves are reflected or refracted by the various subterranean formations with the waves being returned to the earth's surface where they are detected by one or a plurality of geophones or seismometers placed at receiving and recording stations. The electrical effects of these reflected or refracted waves are usually recorded as a function of time, and by means of the observed time required for the waves to travel from the shot point to the receiving station and of the known velocity of the waves traversing the earth, the depth of the subterranean strata may be determined.

Difficulty in determining or recording the time intervals for transmission of the reflected and refracted waves is usually experienced due to interfering surface vibrations travelling through the earth. These vibrations are created by the explosion at the shot point but may also be effected by various other disturbances above the surface of the ground such as heavy equipment traffic. The surface or direct seismic waves are often of considerable magnitude and therefore mask or hide the effects of the desired reflected or refracted waves on the seismic record. The desired waves may become so intermingled with the direct waves that the record of the effects of the explosive charge will not sufficiently differentiate between the desired reflected and refracted waves and the direct waves. Thus, it becomes impossible to assign correct transmission travel times to the reflected or refracted waves, and as a result the depth of the subterranean formations may not be accurately determined.

I have found that the undesirable masking effect of surface waves may be deleted from the seismic record through the use of phase shift differences between waves of separated frequencies in the seismic spectrum. The velocity of propagation of seismic waves travelling through an elastic medium is a direct function of their frequency. Also the amount of phase shift, i.e. the total difference in travel times between seismic waves in two different frequency bands travelling identical paths and originating simultaneously, is directly proportional to the length of path travelled. Since in seismic surveys the strata to be located lie a considerable depth below the surface of the earth the reflected or refracted waves travel a much greater distance in going from the shot point to the recording or detection station than do surface waves travelling between the same points. Thus, the reflected or refracted waves will exhibit more phase shift between their respective frequency bands than will the corresponding frequencies of laterally travelling surface waves which have the shorter travel paths through the earth.

The present invention includes a seismic prospecting system which utilizes these differences in phase shift of the respective frequencies of the reflected or refracted and surface waves to reduce the interfering effect of surface waves on the seismic records. In my system the seismic waves may be induced in the earth at an induction or shot point and then received or detected at or near the surface of the earth at a location spaced from the shot point. The receiving station is occupied by one or a plurality of geophones which may be spaced apart and which are designated by numeral 1 in Figure 1. These geophones are a source of seismic energy which takes the form of an electrical current and passes simultaneously to conventional seismic amplifiers 2 and 3 through conductors 4, 5 and 6. The amplified current from amplifier 3 passes simultaneously to two separate adjustable, narrow bandpass filter meshes 7 and 8. These filters operate simultaneously in different portions of the seismic spectrum and separate spaced-apart frequencies from the geophone output. For instance, filter mesh 7 may pass only the current effected by seismic waves of a lower frequency received by the geophones while filter mesh 8 may pass only the current resulting from the seismic waves of a higher frequency received by the geophone.

The dual filtered outputs of the spaced-apart frequencies from the filter meshes are fed into the circuits of phase shift detector 9 which detects the phase differences between the two frequency bands and delivers to sensitivity controller 10 a fluctuating electrical signal which is proportional, either directly or inversely, to the detected phase differences. This fluctuating signal operates the sensitivity controller 10 which varies the output of amplifier 2 in proportion to the output from the sensitivity controller. The output of amplifier 2 is recorded by recorder 11 to produce a seismic record as a function of time elapsed from the detonation of the explosive charge at the shot point.

It is seen in the present invention that the filter meshes are set to pass respectively only currents of selected frequencies corresponding to the frequencies of spaced-apart seismic waves received by geophone 1. The sensitivity controller is set so that it either materially increases or decreases the amplitude of the output of amplifier 2 from a comparatively constant level, e.g. usually a high or low value which may reach a no output level, only when the phase shift differences between the currents passed by the filter meshes are of a magnitude corresponding to the phase shift difference of seismic waves of the selected frequencies which have been reflected or refracted from the subterranean strata. Accordingly, surface waves of the frequencies selected to be passed by the filters 7 and 8 which are received by geophone 1 will pass through the phase shift detector 9 but since the phase shift difference of these frequencies will be less than those of the selected reflected or refracted waves due to relatively shorter distance of travel of the direct waves, the sensitivity controller will not materially affect the comparatively constant output of amplifier 2 when only the direct waves are being received by geophone 1. Thus, the undesirable effects of these direct waves will not be placed on the seismic record.

In each of the separate procedures of the present invention it is necessary to regulate the transmission distance of the seismic waves in order to keep the phase shift difference between the two selected frequencies of the reflected or refracted waves of a measurable value. Thus, if the travel distance of the seismic waves be such that the selected higher frequency of a succeeding reflected or refracted wave train reaches the geophone at substantially the same time as the selected lower frequency of a previous reflected or refracted wave train, these two selected frequencies would not exhibit a measurable phase shift difference and, therefore, the arrival of the reflected or refracted waves would not be indicated on the seismic record. The probability of selecting a transmission distance which would give this undesirable result is rather remote and, if selected, the operators of my method would be aware that a different distance or different selected frequencies should be utilized.

In general when transmission distances are short the two frequency bands selected should be widely separated, and when the transmission distances are long the selected frequencies should be close together. Thus it is possible to use my invention in seismic prospecting procedures using a number of transmission distances by properly selecting in the seismic spectrum the frequencies passed by the filter meshes.

The phase shift detector and sensitivity controller may operate in various manners to control amplifier 2 as will be readily appreciated by those skilled in the art. The following description will illustrate merely by way of example the operations which can be included in a non-complicated version of these control elements of the present invention. For instance, output signals from the higher frequency bandpass filter can be passed to the grid of a vacuum tube in the phase shift detector. The output circuit of the tube includes a slow-acting relay which upon actuation closes a switch in the sensitivity controller. Also, output signals from the lower frequency bandpass filter are passed to the grid of a separate vacuum tube in the phase shift detector. The output circuit of this tube includes a fast-acting relay which when actuated closes a second switch in the sensitivity controller connected in series with the switch noted above. When both sensitivity controller switches are closed during a given interval the grid potential applied to a vacuum tube in amplifier 2 is increased which in turn increases the amplification of the broadband output from the geophone. This amplified output is registered on the recorder and thus indicates the arrival of a reflected or refracted wave at the geophone.

The fast- and slow-acting relays of the separate circuits of the phase shift detector are so related that the arrivals of reflected or refracted waves will produce the desired amplification of the geophone output while arrivals of surface waves will fail to produce a similar amplification and thus the undesirable surface waves are removed from the seismic record to a substantial degree. To accomplish the desired results the fast-acting relay operates instantaneously upon the arrival of the selected lower frequency signal. The slow-acting relay starts to close upon the arrival of the higher frequency signal. The latter relay is set so that its action is delayed until the lower frequency component of the surface wave has passed through the phase shift detector circuits. The slow-acting relay, however, closes before the anticipated time of arrival of the reflected or refracted wave, and this relay stays closed for a time sufficient to permit the selected lower frequency component of these desired waves to pass through the phase shift detector circuit.

It is seen that in this simplified control system the arrival of the higher frequency component of the surface wave will start the slow-acting relay toward its closed position. The lower frequency component of the surface wave will then arrive and close the fast-acting relay which of course opens immediately. Before the arrival of the reflected or refracted wave the slow-acting relay closes; however, the arrival of the surface wave will not be amplified by amplifier 2 since only one of the phase shift detector relay operated switches of the sensitivity controller is closed at a given instance. Upon arrival of the desired waves the slow-acting relay and its sensitivity controller switch will still be closed and the lower frequency component of the desired wave will close the fast-acting relay and its sensitivity controller switch to effect the amplification of the broadband geophone output and thus indicate the arrival of the reflected or refracted wave on the seismic record.

The above described technique may best be used in connection with a broadband playback system since time delays inherent in filters and automatic control systems are frequently too long to allow their use to control instantaneously the response of an amplifier. In the use of a broadband playback system, an arrangement of apparatus such as that of Figure 1 might be used. However, instead of the source seismic energy being geophones 1 as described above, numeral 1 designates a broadband playback sound or magnetic reproducible record taken of the effects of the charge exploded at the shot point and detected at the receiving station by geophones. This record may be repeatedly used in the laboratory until the most advantageous settings of the filter meshes are obtained. Thus, operators of my system might avoid the expense of repeated field experiments where results are ruined or deleteriously affected by errors or improper settings in the recording system.

Such a system would not erase the effects of the time lags inherent in filters and automatic control systems noted above. This difficulty may be overcome in a broadband playback system by making a phase shift control magnetic reproducible record from the original master broadband record. This phase shift record is then played back simultaneously with the master record and with the phase shift recording having sufficient time lead to anticipate the lag inherent in the amplifier control circuits.

In terms of the system shown in Figure 1, this phase shift record would represent the fluctuations in signals passing from phase shift detector 9 to sensitivity controller 10. In making this record, I replay a broadband playback sound or magnetic reproducible record represented by numeral 13, Figure 2, and pass its electrical current effects through line 14 to amplifier 15 and narrow bandpass filters 16 and 17. The filters select the desired frequencies from the output of the record as described above in connection with Figure 1. The outputs from the filters pass through phase shift detector 18 and the signal fluctuations from the detector are recorded as a function of time by recorder 19 as the phase shift record.

I then take the phase shift record and replay it and the broadband playback record simultaneously by starting the phase shift record first to allow for the inherent time lags of the recording system. The output of the broadband record, for instance, represented by numeral 1, Figure 1, is passed through line 4 to amplifier 2. The output of the phase shift record is passed to sensitivity controller 10 and to recorder 11 which records the controlled output of the amplifier 2 as described above. In this system there, of course, is no need for line 6, amplifier 3, filters 7 and 8, and phase shift detector 9 of the system of Figure 1. The phase shift record may be started before the broadband playback record to allow for inherent time lags in the phase shift recording apparatus, the sensitivity controller and any other devices in the recording systems.

It should be noted that although in the usual case of each aspect of the present invention the output of geophone or recording 1 is controlled by varying the amplitude of amplifier 2, it might be desirable in certain instances to replace the amplifier by another device which need only provide for a comparatively constant amplitude level in the circuit from the geophone or recording 1 to recorder 11. In such cases the sensitivity controller would vary this constant output level as described previously.

In another aspect my invention provides a method of using the phase shift between two frequency bands as the basic operating principle of a seismic exploration instrument. This aspect of the invention is also illustrated by the system of Figure 2. In this method the output of a source of seismic energy 13, which may be either a geophone or a broadband playback sound or magnetic reproducible recording, is passed to an amplifier 15 which is associated with two narrow bandpass filter meshes 16 and 17 operating at different positions in the seismic spectrum. The filters select and separate from the geophone or record output the spaced-apart desired frequencies as described in conjunction with Figure 1. The outputs of the filter meshes are fed into the circuits of phase shift detector 18 which detects the difference in phase shift of the frequencies passed by the filters. The detector delivers a signal to the recorder 19 which signal fluctuates in a manner proportional to the phase shift between the selected frequencies. This fluctuating signal is recorded by recorder 19 as a function of time to produce the seismic record. In this method the variations in phase shift are used as a basis of correlation to determine the depth of the reflecting or refracting strata by completion of the seismic survey.

Instead of recording the output of recorder 19 it is sometimes desirable to visually compare the wave forms from the two filter channels to determine or follow the phase shift throughout a wave train. This is done by passing the outputs of the filters to a cathode ray oscilloscope or a recording oscillograph.

In general, the above descriptions apply to one seismic recording channel. However, they are equally applicable to systems involving multiple channels which provide for subsurface reflection or refraction continuity and definition.

I claim:

1. In a method of seismic surveying in which seismic waves are initiated in an elastic medium at an induction point and in which desired reflected or refracted waves and undesired surface waves travel to and are detected by a geophone at a receiving station, the improvement which comprises locating the geophone at a distance from the induction point such that two selected and spaced-apart frequencies of the desired seismic waves initiated at the induction point have a measurable difference in travel time separating from the output of the geophone two frequencies corresponding to the selected frequencies of the seismic wave, detecting the difference in travel time between the two separated frequencies of the geophone output, controlling the amplitude of the geophone output to vary the output materially only when the detected difference in travel time between the selected frequencies is substantially greater than the difference in travel time between the corresponding frequencies of the seismic surface waves detected by the geophone.

2. In a method of seismic surveying in which seismic waves are initiated in an elastic medium at an induction point, in which desired reflected or refracted waves and undesired surface waves travel to and are detected by a geophone at a receiving station and in which the geophone output is recorded, the improvement which comprises locating the geophone at a distance from the induction point such that two selected and spaced-apart frequencies of the desired seismic waves initiated at the induction point have a measurable difference in travel time, separating from the output of the geophone two frequencies corresponding to the selected frequencies of the seismic wave, detecting the difference in travel time between the two separated frequencies of the geophone output, controlling the amplitude of the geophone output to vary the output materially only when the detected difference in travel time between the selected frequencies is substantially greater than the difference in travel time between the corresponding frequencies of the seismic surface waves detected by the geophone.

3. In a method of seismic surveying in which seismic waves are initiated in an elastic medium at an induction point and in which desired reflected or refracted waves and undesired surface waves travel to and are detected by a geophone at a receiving station, the improvement which comprises locating the geophone at a distance from the induction point such that two selected and spaced-apart frequencies of the desired seismic waves initiated at the induction point have a measurable difference in travel time, recording the output of the geophone on a broadband playback record, replaying the record, separating from the record output two frequencies corresponding to the selected frequencies of the seismic wave, detecting the difference in travel time between the two separated frequencies of the record output, and controlling the amplitude of the record output to vary the output materially only when the detected difference in travel time between the selected frequencies is substantially greater than the difference in travel time between the corresponding frequencies of the seismic surface waves detected by the geophone.

4. In a method of seismic surveying in which seismic waves are initiated in an elastic medium at an induction point and in which desired reflected or refracted waves and undesired surface waves travel to and are detected by a geophone at a receiving station, the improvement which comprises locating the geophone at a distance from the induction point such that two selected and spaced-apart frequencies of the desired seismic waves initiated at the induction point have a measurable difference in travel time, recording the output of the geophone on a broadband playback record, replaying the record, separating from the record output two frequencies corresponding to the selected frequencies of the seismic wave, detecting the difference in travel time between the two separated frequencies of the record output, controlling the amplitude of the record output to vary the output materially only when the detected difference in travel time between the selected frequencies is substantially greater than the difference in travel time between the corresponding frequencies of the seismic surface waves detected by the geophone, and recording the controlled output of the playback record.

5. In a method of seismic surveying in which seismic waves are initiated in an elastic medium at an induction point and in which desired reflected or refracted waves and undesired surface waves travel to and are detected by a geophone at a receiving station, the improvement which comprises locating the geophone at a distance from the induction point such that two selected and spaced-apart frequencies of the desired seismic waves initiated at the induction point have a measurable difference in travel time, recording the output of the geophone on a broadband playback record, replaying the record, separating from the record output two frequencies corresponding to the selected frequencies of the seismic wave, detecting the difference in travel time between the two separated frequencies of the record output, recording the fluctuating effect from the detection of the selected frequencies to get a travel time difference record, replaying the broadband playback record simultaneously with the travel time difference record while starting the difference in travel time record sufficiently in advance of the broadband playback record to allow for inherent time lags in the recording systems, and controlling the amplitude of the output from the broadband playback record to vary the output materially only when the detected difference in travel time between the selected frequencies is substantially greater than the difference in travel time between the corresponding frequencies of the seismic surface waves detected by the geophone.

6. In a method of seismic surveying in which seismic waves are initiated in an elastic medium at an induction point and in which desired reflected or refracted waves and undesired surface waves travel to and are detected by a geophone at a receiving station, the improvement which comprises locating the geophone at a distance from the induction point such that two selected and spaced-apart frequencies of the desired seismic waves initiated at the induction point have a measurable difference in travel time, recording the output of the geophone on a broadband playback record, replaying the record, separating from the record output two frequencies corresponding to the selected frequencies of the seismic wave, detecting the difference in travel time between the two separated frequencies of the record output, recording the fluctuating effect from the detection of the selected frequencies to get a travel time difference record, replaying the broadband playback record simultaneously with the travel time difference record while starting the travel time difference record sufficiently in advance of the broadband playback record to allow for inherent time lags in the recording systems, and controlling the amplitude of the output from the broadband playback record to vary the output materially only when the detected difference in travel time between the selected frequencies is substantially greater than the difference in travel time between the corresponding frequencies of the seismic surface waves detected by the geophone, and recording the controlled output of the broadband playback record.

References Cited in the file of this patent

UNITED STATES PATENTS

| | | |
|---|---|---|
| 2,355,826 | Sharpe | Aug. 15, 1944 |
| 2,374,204 | Hoover | Apr. 24, 1945 |
| 2,620,890 | Lee et al. | Dec. 9, 1952 |